(12) United States Patent
Kim et al.

(10) Patent No.: US 9,323,594 B2
(45) Date of Patent: Apr. 26, 2016

(54) SEMICONDUCTOR DEVICE AND METHOD OF OPERATING THE SAME

(71) Applicant: SK hynix Inc., Gyeonggi-do (KR)

(72) Inventors: Jae Bum Kim, Gyeonggi-do (KR); Sang Chul Lee, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 164 days.

(21) Appl. No.: 14/176,831

(22) Filed: Feb. 10, 2014

(65) Prior Publication Data

US 2015/0143203 A1    May 21, 2015

(30) Foreign Application Priority Data

Nov. 15, 2013   (KR) .................... 10-2013-0138891

(51) Int. Cl.
*G11C 29/00* (2006.01)
*G06F 11/07* (2006.01)

(52) U.S. Cl.
CPC ........ *G06F 11/0727* (2013.01); *G06F 11/0793* (2013.01)

(58) Field of Classification Search
CPC .................... G06F 11/0727; G06F 11/0793
USPC .................................................. 714/794, 721
See application file for complete search history.

(56) References Cited

U.S. PATENT DOCUMENTS

| | | | | |
|---|---|---|---|---|
| 5,699,117 A | * | 12/1997 | Uramoto | H04N 19/70 348/390.1 |
| 8,164,953 B2 | * | 4/2012 | Chen | G11C 8/08 365/185.09 |
| 8,332,726 B2 | * | 12/2012 | Uchikawa | G06F 11/1068 365/185.24 |
| 8,625,437 B2 | * | 1/2014 | Pison | H04W 76/02 370/241 |
| 2012/0079355 A1 | * | 3/2012 | Patapoutian | G06F 11/1048 714/780 |
| 2013/0159798 A1 | * | 6/2013 | Yang | G06F 11/1048 714/721 |
| 2015/0220389 A1 | * | 8/2015 | Kim | G06F 11/1068 714/764 |

FOREIGN PATENT DOCUMENTS

KR   1020090099756   9/2009

* cited by examiner

*Primary Examiner* — David Ton
(74) *Attorney, Agent, or Firm* — IP & T Group LLP

(57) ABSTRACT

A semiconductor device includes a memory device suitable for outputting health monitoring data including information on a threshold voltage distribution, and outputting read data read from memory cells included in the memory device, and a controller suitable for receiving a predetermined quantity of the read data from the memory device based on the health monitoring data, and performing a decoding operation for an error correction by using the received read data.

20 Claims, 7 Drawing Sheets

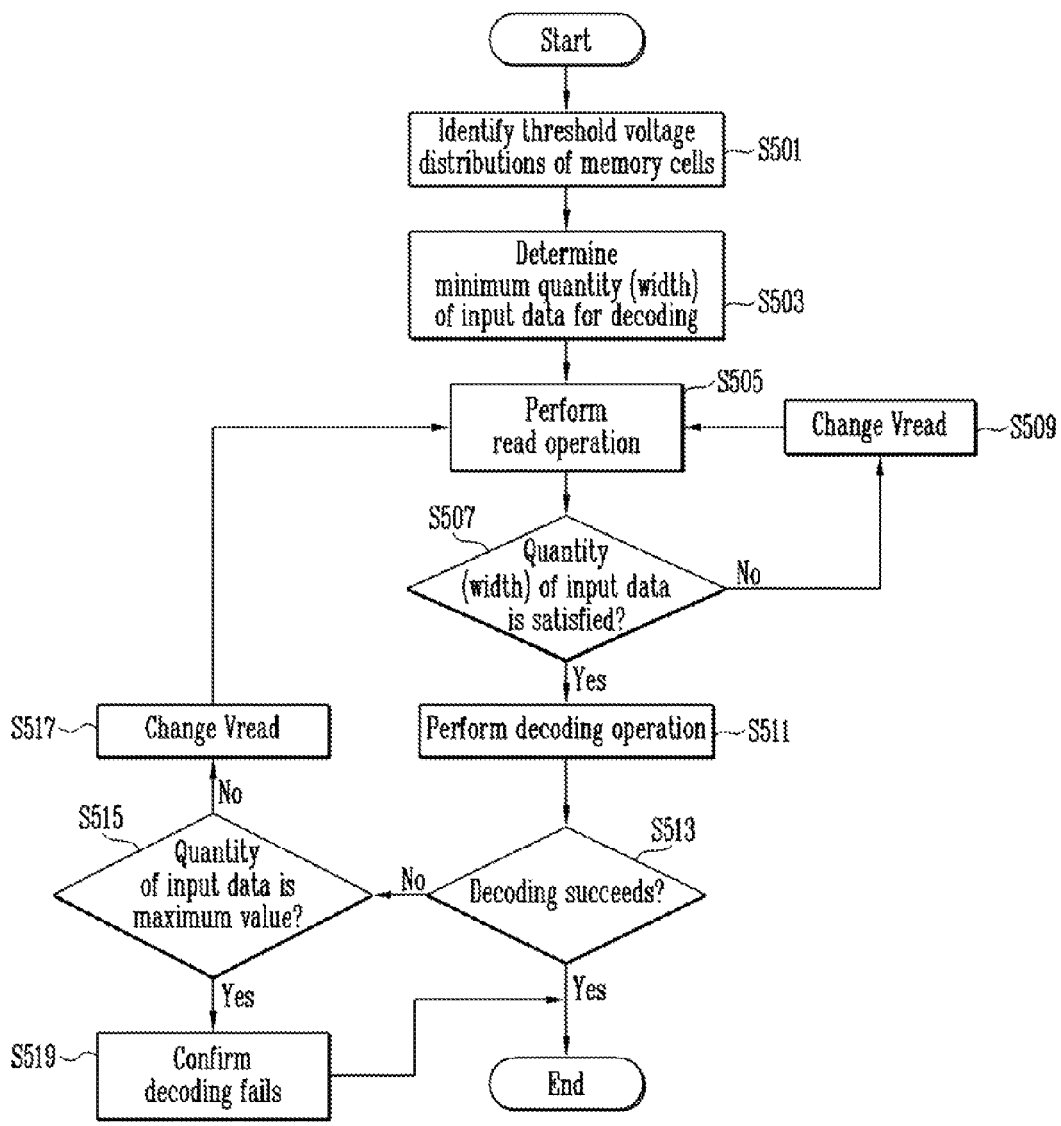

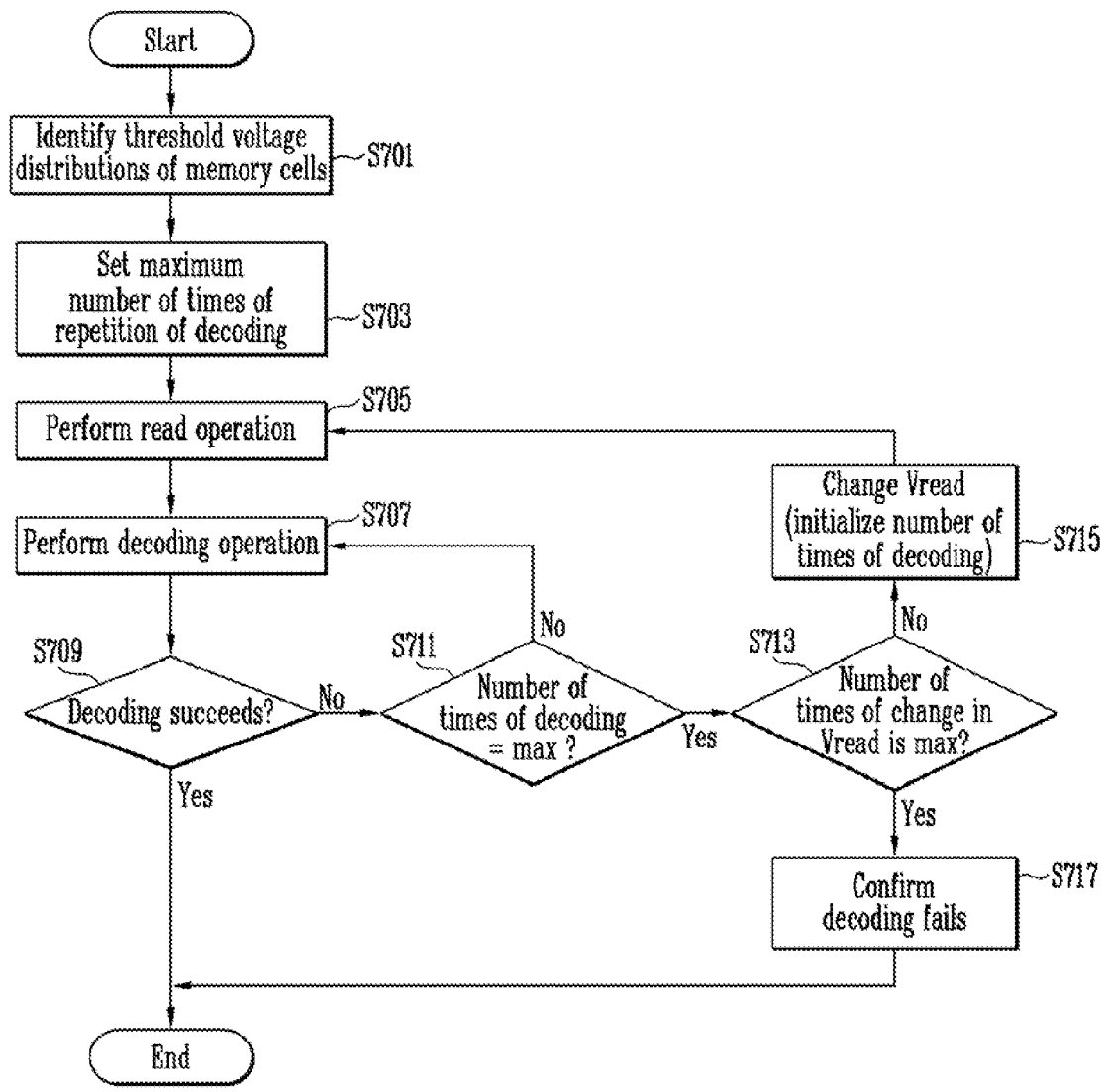

SEMICONDUCTOR DEVICE AND METHOD OF OPERATING THE SAME

CROSS-REFERENCE TO RELATED APPLICATION

The present application claims priority of Korean patent application number 10-2013-0138891, filed on Nov. 15, 2013, in the Korean Intellectual Property Office, the entire disclosure of which is incorporated herein by reference in its entirety.

BACKGROUND

1. Field of Invention

Various embodiments of the present invention relate to a semiconductor design technology, and more particularly, to a semiconductor device including a nonvolatile memory cell, and a method of operating the same.

2. Description of Related Art

A flash memory cell is a representative nonvolatile memory cell. A threshold voltage of the flash memory cell is changed depending to data stored in the flash memory cell. When data of two bits is stored in the flash memory cell, threshold voltages of the flash memory cells are distributed at four types of levels for example, an erase level, and first to third program levels.

According to an increase in an integration degree, an interference between the flash memory cells becomes severe, and thus, a threshold voltage distribution width of the flash memory cells at each level is increased, and an overlapping region in the threshold voltage distributions positioned at different levels is generated. As a result, an error may be generated in a process of reading data stored in the flash memory cell.

SUMMARY

Various embodiments of the present invention are directed to a semiconductor device capable of decreasing power consumption and improving an error correction speed, and a method of operating the same.

An embodiment of the present invention provides a semiconductor device including: a memory device suitable for outputting health monitoring data including information on a threshold voltage distribution and outputting read data read from memory cells included in the memory device; and a controller suitable for receiving a predetermined quantity of read data from the memory device based on the health monitoring data and performing the decoding operation for an error correction by using the received read data.

Another embodiment of the present invention provides a semiconductor device including: a memory device suitable for outputting health monitoring data including information on a threshold voltage distribution and outputting read data read from memory cells included in the memory device; and a controller suitable for receiving the health monitoring data and the read data from the memory device and repeatedly performing a decoding operation for an error correction by the predetermined number of times based on the health monitoring data until the decoding operation using the read data succeeds.

Another embodiment of the present invention provides a semiconductor device including: a memory device suitable for outputting health monitoring data including information on a threshold voltage distribution and outputting read data read from memory cells included in the memory device; and a controller suitable for performing decoding, operations for an error correction of the read data, wherein the number of repetition of the decoding operations is determined based on the health monitoring data.

According to the embodiments of the present invention, power consumption may be decreased and an error correction speed may be improved.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and advantages of the present invention will become more apparent to those of ordinary skill in the art by describing in detail embodiments thereof with reference to the attached drawings in which:

FIG. 5 is a flowchart for describing a method of operating a semiconductor device according to an exemplary embodiment of the present invention;

FIG. 7 is a flowchart for describing a method of operating a semiconductor memory device according to an exemplary embodiment of the present invention.

DESCRIPTION OF EMBODIMENTS

Figure 1:
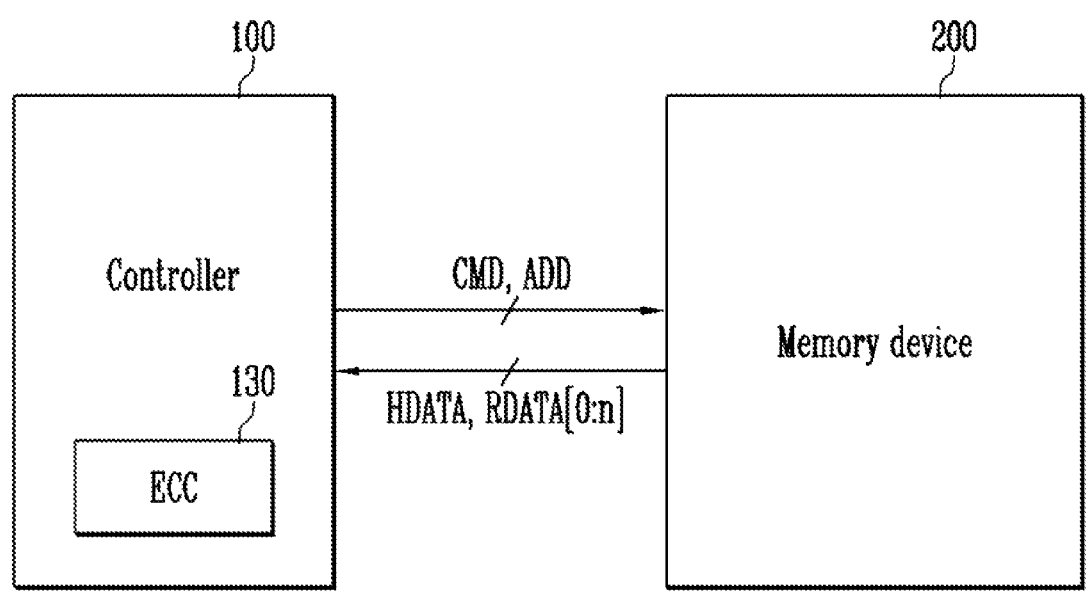
FIG. 1 is a block diagram illustrating a semiconductor device according to an exemplary embodiment of the present invention.

Hereinafter, an exemplary embodiment of the present invention will be described with reference to the accompanying drawings in detail. However, the present invention is not limited to an exemplary embodiment disclosed below and may be implemented in various forms and the scope of the present invention is not limited to the following exemplary embodiments. Rather, the exemplary embodiment is provided to more sincerely and fully disclose the present invention and to completely transfer the spirit of the present invention to those skilled in the art to which the present invention pertains, and the scope of the present invention should be understood by the claims of the present invention. Throughout the disclosure, reference numerals correspond directly to the like numbered parts in the various figures and embodiments of the present invention.

Throughout the specification, it will be understood that when an element is referred to as being "connected" or "coupled" to another element, it can be directly connected or coupled to the other element or intervening elements may be present. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Figure 2:
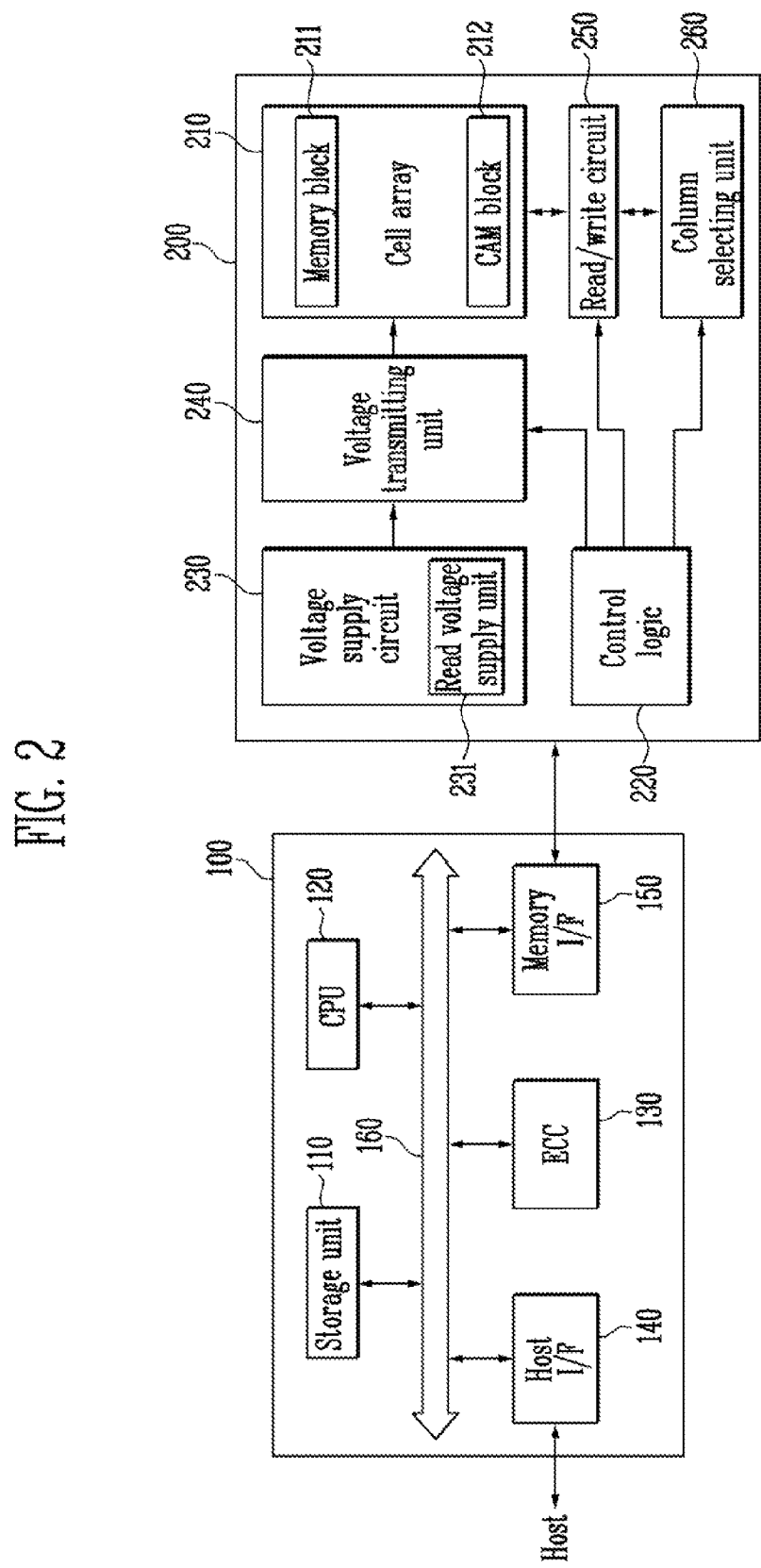
FIG. 2 is a detailed diagram of the semiconductor device shown in FIG. 1.
Figure 3:
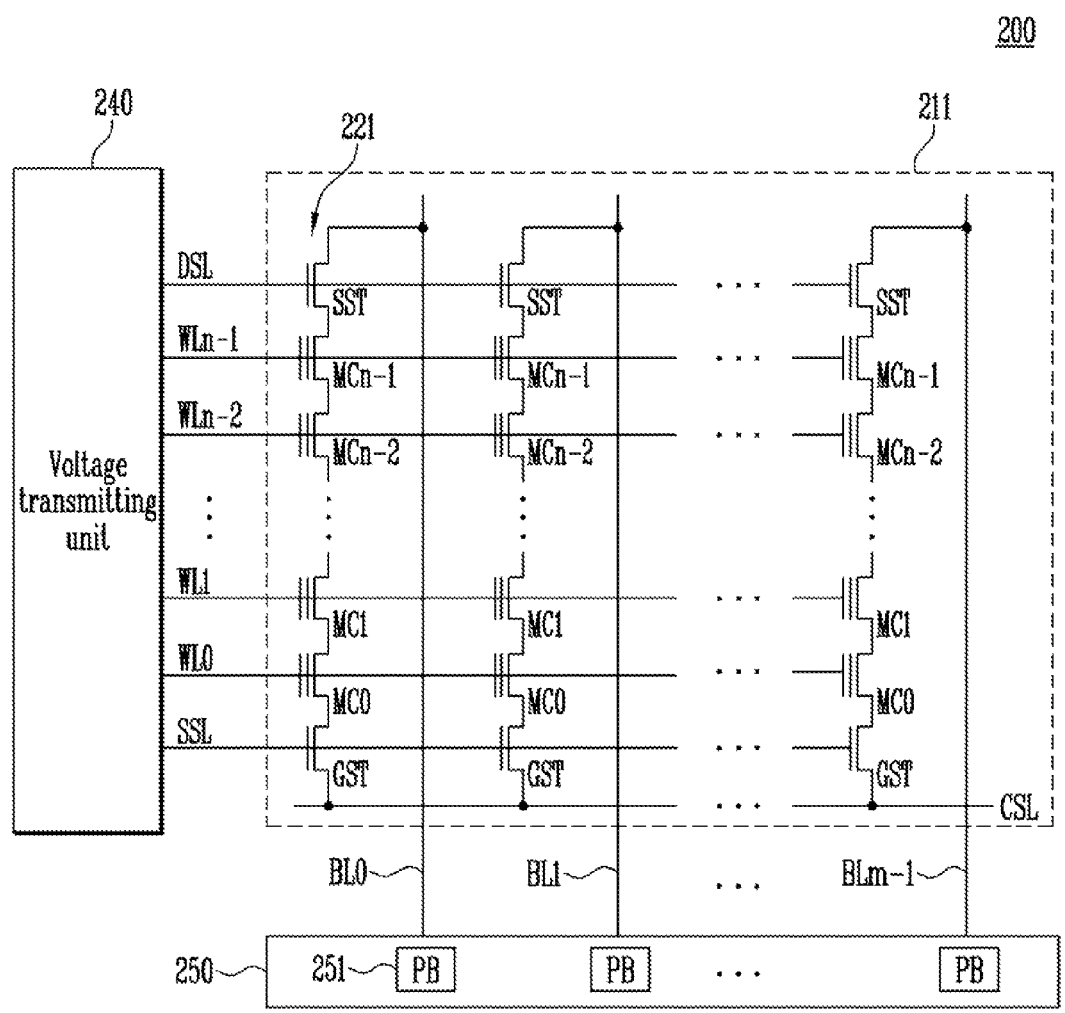
FIG. 3 is a detailed diagram of a memory block shown in FIG. 2.

FIG. 1 is a block diagram illustrating a semiconductor device 10 according to an embodiment of the present invention. FIG. 2 is a detailed diagram of the semiconductor device 10 shown in FIG. 1. FIG. 3 is a detailed diagram of a memory block shown in FIG. 2.

Referring to FIG. 1, the semiconductor device 10 may include a controller 100 and a memory device 200. The controller 100 may control the memory device 200. The controller 100 may include an error correction circuit (ECC) 130 for correcting an error of data read from the memory device 200.

The memory device 200 may provide health monitoring data HDATA to the controller 100 to identify threshold voltage distributions of memory cells. The health monitoring data HDATA may be stored in a content-addressable memory (CAM) block 212 (see FIG. 2) included in the memory device 200. When power is increased to a stable level while a power-up is performed, the memory device 200 may read the health monitoring data HDATA from the CAM block 212 and then output the read health monitoring data HDATA to the controller 100. The health monitoring data HDATA may include data denoting the number use (i.e. count of how many times the memory cell is used) of the memory cells, such as the number of accumulated times of repeated program/erase operations, data denoting deterioration of the memory cells, or data denoting the threshold voltage distribution.

Further, the memory device 200 may output data RDATA[0:n] read from the memory block 211 (see FIG. 2) selected based on a command signal CMD and an address ADD to the controller 100. The error correction circuit 130 of the controller 100 may correct an error of the read data RDATA[0:n] and then output the corrected read data RDATA[0:n] to a host.

Particularly, the error correction circuit 130 requires a process of combining a plurality of read data, which are read from the memory cells by using read voltages with different levels, to generate a soft input value for a decoding operation. As the number of times of read operations of reading the read data by using the different read voltages increases, a bit width of the soft input value increases. For example, if the bit width of the soft input value is set to 3, three read operations are to be performed with changing of the read voltage applied to the memory cells. Subsequently, the error correction circuit 130 generates a soft input value by using three read data obtained through three times of read operations and performs a decoding operation by using the generated soft input value.

When the error correction circuit 130 fails the decoding operation, the memory device 200 additionally reads read data with changing of the read voltage based on the co and signal CMD from the controller 100, and then outputs the read data to the controller 100. The error correction circuit 130 performs the decoding operation again by using the additionally obtained read data. As described above, when the decoding operation fails, the additional read operation is to be performed.

The decoding operation may succeed only with one read data. Thus, the decoding operation performed by using a number of read data from the beginning may lower the operation speed of the semiconductor device 10 due to redundant read operations. Meanwhile if the decoding operation is started with only one read data even when a number of read data are required, the number of times of decoding operations is to be increased, so that the operation speed may be lowered.

Accordingly, the controller 100 may determine a minimum quantity of read data used for the decoding operation by using the health monitoring data HDATA including information on the threshold voltage distributions of the memory cells. For example, when the threshold voltage distribution is determined to be wide based on the health monitoring data HDATA, the controller 100 may increase the quantity of the read data RDATA[0:n] used for an initial decoding operation, and when the threshold voltage distribution is determined to be narrow, the controller 100 may decrease the quantity of read data RDATA[0:n] used for an initial decoding operation. Further, the controller 100 receives the predetermined quantity of the read data RDATA[0:n] from the memory device 200 based on the health monitoring data HDATA, and then performs an initial decoding operation by using the received read data, so that the number of times of the redundant decoding operations may be decreased, thereby improving an operation speed.

Further, the error correction circuit 130 of the controller may receive the health monitoring data HDATA and the read data RDATA[0:n] from the memory device 200, and repeatedly perform the decoding operation by the predetermined number of times based on the health monitoring data HDATA until the decoding operation using the read data RDATA[0:n] succeeds. Accordingly, it may be possible to decrease the number of times of the redundant decoding operations, so that an operation speed may be improved. Similarly, when the threshold voltage distribution is determined to be wide based on the health monitoring data HDATA, the controller 100 may increase the number of times of the repeated performance of the decoding operation, and when the threshold voltage distribution is determined to be narrow based on the health monitoring data HDATA, the controller 100 may decrease the number of times of the repeated performance of the decoding operation. Detailed contents will be described below.

The controller 100 and the nonvolatile memory device 200 may be integrated as one semiconductor device. The controller 100 and the memory device 200 may be integrated as one semiconductor device to configure a solid-state drive (SSD). The controller 100 and the nonvolatile memory device 200 may be integrated as one semiconductor device to configure a memory card. For example, the controller 100 and the nonvolatile memory device 200 may be integrated as one semiconductor device to form a memory card, such as a PC card (e.g., personal computer memory card international association (PCMCIA)), a compact flash (CF) card, a smart media (SM) card, a memory stick, a multimedia card (eg., an MMC, an RS-MMC, and an MMCmicro), an SD card (e.g., an SD, a miniSD, a microSD, and an SDHC), and a universal flash storage (UFS).

The controller 100 and the nonvolatile memory device 200 may be integrated as one semiconductor device to form a solid-state drive (SSD), The solid state drive includes a storage device that may store data in a semiconductor memory. When the semiconductor device 10 is used as the SSD, a speed of the operation of the host connected to the semiconductor device 10 may be remarkably improved.

For another example, the semiconductor device 10 is provided as one of various constituent elements of an electronic device, such as a computer, an ultra mobile PC (e.g., a UMPC, a workstation, a net-book computer, personal digital assistants (PDA), a portable computer, a web tablet PC, a wireless phone, a mobile phone, a smart phone, an e-book reader, a portable multimedia player (PMP), a portable game device, a navigation device, a black box, a digital camera, a 3-dimensional television, a digital audio recorder, a digital audio player, a digital picture recorder, a digital picture player, a digital video recorder, a digital video player, a device capable transceiving information in a wireless environment, one of various electronic devices configuring, a home network, one of various electronic devices configuring a computer network, one of various electronic devices configuring a telematics network, an RFID device, or one of various constituent elements devices configuring a computing system.

Referring to FIG. 2, the flash memory controller 100 may include a storage unit 110, a CPU 120, the error correction circuit 130, a host interface 140, a memory interface 150, and a system bus 160. The storage unit 110 may operate as a working memory of the CPU 120.

The host interface 140 may communicate with a host through at least one of various interface protocols, such as a universal serial bus (USB), a multi-media card (MMC), a peripheral component interconnect-express (PCI-E), a serial-attached SCSI (SAS), a serial advanced technology attachment (SATA), a parallel advanced technology attachment (PATA), a small computer system interface (SCSI), an enhanced small disk interface (ESDI), and an integrated drive electronics (IDE).

The error correction circuit 130 detects and corrects an error included in the data read from the memory device 200 as described above. The memory interface 150 interfaces with the memory device 200 of the present invention. The CPU 120 performs general various control operations.

The memory device 200 may include a cell array 210, a control logic 220, a voltage supply circuit 230, a voltage transmitting unit 240, a read/write circuit 250, and a column selecting unit 260.

The cell array 210 may include a plurality of memory blocks 211 and the CAM block 212. User data may be stored in the memory block 211, and data, for example, HDATA, related to the information about the memory device 200 may be stored in the CAM block 212. The memory block 211 and the CAM block 212 may be formed in the same structure.

The memory block 211 may include a plurality of cell strings (i.e., NAND strings) 221 connected to bit lines BL0 to BLm-1, respectively. The cell string 221 of each column may include at least one drain selection transistor DST and at least one source selection transistor SST.

A plurality of memory cells (or memory cell transistors) may be serially connected between the selection transistors DST and SST, Each of the memory cells MC0 to MCn-1 may be formed of a multi-level cell (MLC) storing data information of multiple bits in each cell. The strings 221 may be electrically connected to the corresponding bit lines BL0 to BLm-1, respectively.

FIG. 3 illustrates an example case in which the memory block 211 is formed of an NAND-type flash memory. However, the memory block 211 of the memory device 200 is not limited to the NAND flash memory, but may be formed of a NOR-type flash memory, a hybrid flash memory in which two types or more of memory cells are combined, and a One-NAND flash memory in which a controller is embedded inside a memory chip. A characteristic of the operation of the semiconductor device may be applied to a charge trap flash (CTF) in which a charge storing layer is formed by an insulating layer, as well as the flash memory device in which a charge storing layer is formed as a conductive floating gate.

The control logic 220 may control various operations related to program, erase, and read operations of the memory device 200. The voltage supply circuit 230 may provide word lines voltages, for example, a program voltage, a read voltage, and a pass voltage, to be supplied to the respective word lines according to an operation mode, and a voltage to be supplied to a bulk, for example, a well region, formed n the memory cells. A voltage generating operation of the voltage supply circuit 230 may be performed under control of the control logic 220. A variable read voltage generating unit 231 is included in the voltage supply circuit 230, so that a plurality of variable read voltages may be generated during the read operation for generating a plurality of read data.

The voltage transmitting unit 240 may select one of the memory blocks (or sectors) of the memory cell array 210 under the control of the control logic 220, and may select one among the word lines of the selected memory block. The voltage transmitting unit 240 may provide the word line voltage generated from the voltage supply circuit 230 to the selected word line or non-selected word lines under the control of the control logic 220.

The read/write circuit 250 is controlled by the control logic 220 and may operate as a sense amplifier or a write driver according to an operation node. For example, in a case of a verification/normal read operation, the read/write circuit 250 is operated as a sense amplifier for reading data from the memory cell array 210. The column selecting unit 260 outputs the data read from the read/write circuit 250 to the outside, for example, the controller, in response to column address information during the normal read operation. On the other hand, the data read during the verification read operation may be provided to a pass/fail verification circuit (not illustrated) included in the memory device 200, and be used for determining whether the program operation of the memory cells succeeds.

In a case of the program operation, the read/write circuit 250 is operated as a write driver for driving the bit lines according to data to be stored in the cell array 210. The read/write circuit 250 receives the data to be written in the cell array 210 during the program operation from a buffer (not illustrated), and drives the bit lines according to the input data. To this end, the read/write circuit 250 may be formed of a plurality of page buffers PB 251 corresponding to the columns (or the bit lines) or column pairs (or bit line pairs). A plurality of latches may be Included in each page buffer 251.

Figure 4A:
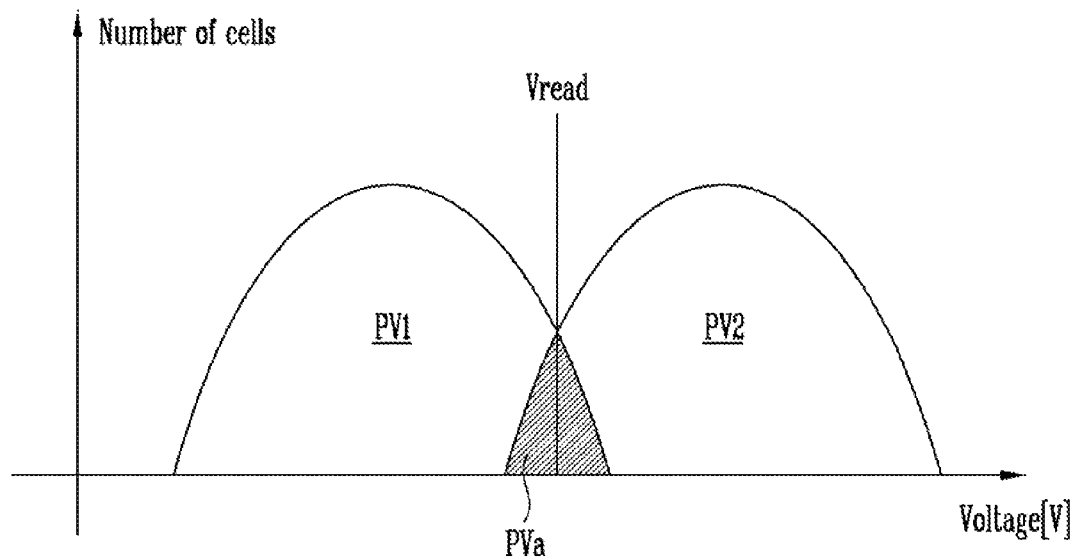
FIGS. 4A and 4B are diagrams for describing a threshold voltage distributions of memory cells shown in FIG. 2.
Figure 4B:
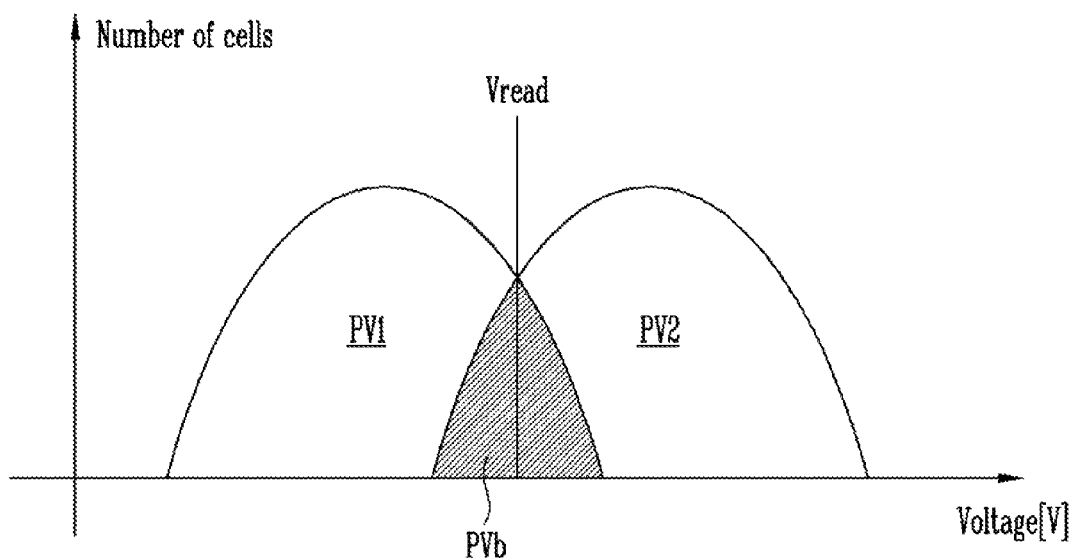

FIG. 4A and 4B are diagrams for describing threshold voltage distributions of the memory cells shown in FIG. 2.

Referring to FIG. 4A, as a size of unit memory cell is decreased to increase an integration degree of the memory device, and as the program/erase operations of the data are repeatedly performed, an electrical characteristic of the memory cells deteriorates. At an initial stage in which the program/erase operations are performed for a small number of times after the memory device is manufactured, widths of the threshold voltage distributions are not wide in levels PV1 and PV2, so that threshold voltage distributions may not overlap each other, or a region PVa, in which the threshold voltage distributions overlaps, is small.

Accordingly, even though the read operation is performed with a read voltage Vread, the number of error bits included in the data is small, so that it may be possible to easily correct the error bit.

Referring to FIG. 4B, since a physical/electrical characteristic of the memory cells deteriorates as the accumulated number of times of the program/erase operations increases, so that a region PVb, in which the threshold voltage distributions overlap each other, is wide at the levels PV1 and PV2. Accordingly, when the read operation is performed with the read voltage Vread, the number of error bits included in the data increases, so that the number of times of the decoding operation of the error correction circuit 130 increases to correct the error bit.

Accordingly, a condition of the error correct operation is preferably changed based on the health monitoring data to identify the threshold voltage distributions of the memory cells.

Figure 6:
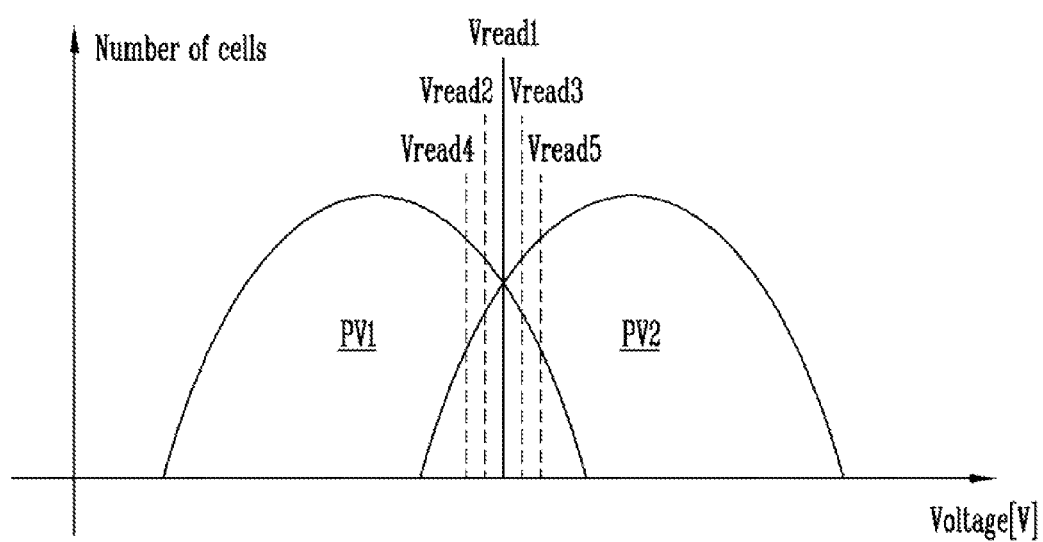
FIG. 6 is a diagram for describing the method of operating the semiconductor device shown in FIG. 5.

FIG. 5 is a flowchart for describing a method of operating the semiconductor device according to an embodiment of the present invention. FIG. 6 is a diagram for describing the method of operating the semiconductor device shown in FIG. 5.

Referring to FIGS. 1 and 5, an operation for identifying, threshold voltage distributions of the memory cells is performed in step S501. For example, the controller 100 may identify the threshold voltage distributions of the memory cells by using the health monitoring data HDATA provided by the memory device 200. To this end, when power is increased to a stable level while a power-up is performed, the memory device 200 may read the health monitoring data from the CAM block 212 and then output the read health monitoring data to the controller 100.

In step S503, the controller 100 may determine a minimum quantity of read data used for decoding during the read operation based on the health monitoring data HDATA. Hereinafter, a case, in which it is determined preferable that the decoding operation starts after a minimal of three read data is input, will be described as an example. Here, the determination is on the basis of a result of the identification of the width of the threshold voltage distribution based on the health monitoring data HDATA.

In step S505, the read operation is performed. When the read operation is performed, the controller 100 outputs the command signal CMD and the address signal ADD to the memory device 200. The controller 100 controls the memory device 200 so that the memory device 200 may output three read data by using different read voltages based on the health monitoring data First, the memory device 200 reads first read data from the memory cells by using a first read voltage, and then outputs the read first read data to the controller 100.

In step S507, the controller 100 determines whether all of the predetermined quantity of read data is input. As a result, when the quantity of input read data is short, the controller 100 changes the read voltage in step S509, and the memory device 200 outputs second read data to the controller 100 by performing the read operation with the changed read voltage in step S505. Steps S505 to S509 are repeatedly performed until the predetermined quantity of read data is input to the controller 100.

More particularly, referring to FIGS. 1 and 6, the controller 100 controls the memory device 200 so that the memory device 200 may output three read data by using different read voltages Vread1 to Vread3 based on the health monitoring data HDATA. The memory device 200 outputs the first read data RDATA[1] read from the selected memory cells of the memory block to the controller 100 by using the first read voltage Vread1. Next, the memory device 200 outputs second and third read data RDATA[2] and RDATA[3] read from the selected memory cells of the memory block to the controller 100 by using second and third read voltages Vread2 and Vread3, respectively. In this case, the memory device 200 performs the read operation with changing of the read voltage in the range PVa in which the adjacent threshold voltage distributions PV1 and PV2 overlap.

Referring back to FIG. 5, a decoding operation is performed in step S511. The error correction circuit 130 of the controller 100 generates a soft input value by using the first to third data RDATA[0:2], and performs decoding by using the generated soft input value. The decoding operation of the error correction circuit 130 using the soft input value is an already publicly known technology, so that a detailed description thereof will be omitted.

In step S513, it is determined whether the decoding operation of the error correction circuit 130 succeeds.

When the decoding operation fails, it is determined whether the quantity of read data input to the controller 100 for the decoding operation reaches a maximum allowance value in step S515. For example, when the three read data are input to the controller 100 for the decoding operation in a previous step while a maximum of five read data is capable of being input, it is determined that the quantity of read data input to the controller 100 does not reach the maximum allowance value.

The read voltage is changed in step S517, and the memory device 200 outputs fourth read data to the controller 100 by performing the read operation with the changed read voltage, for example, Vread4 of FIG. 6, in step S505. If necessary, the memory device 200 may further output fifth read data to the controller 100 by performing the read operation with a changed read voltage, for example, Vread5 of FIG. 6, in steps S507 and S509 before performing the step S511. However, when the decoding operation fails after performing decoding step S511, the memory device 200 may further output the fifth read data to the controller 100 by performing the read operation with the changed read voltage, for example, Vread5 of FIG. 6, in steps S515 and S505.

When the decoding operation succeeds after the fifth read data is input to the controller 100, the decoded data is output to the outside, for example, a host. However, when the decoding operation fails after the fifth read data is input to the controller 100, the decoding operation fails and the process is ended through steps S515 and S519.

According to the above descriptions, a minimum quantity of read data used for the decoding operation is determined by using the health monitoring data HDATA including information on the threshold voltage distributions of the memory cells, a predetermined quantity of the read data RDATA[0:n] is received from the memory device 200 and then the decoding operation is performed, so that the number of times of the decoding operations may be decreased, thereby improving an operation speed.

FIG. 7 is a flowchart for describing a method of operating a semiconductor memory device according to another exemplary embodiment of the present invention.

Referring to FIGS. 1 and 7, an operation for identifying threshold voltage distributions of the memory cells is performed in step S701. Step S701 may be performed by the same manner as that of step S501 described with reference to FIG. 5.

In step S703, the controller 100 may determine (or set) the maximum number of times of repetition of the decoding operations of the data input from the memory device 200 through the read operation based on the health monitoring data HDATA. A hard decision method and a soft decision method may be applied to the error correction circuit 130 as an error correction method. The hard decision means a method of correcting an error of the data by using only data, for example, hard decision data, read according to an on/off characteristic of a memory cell when a read voltage is applied, and error correction codes. Further, the soft decision means a method of correcting an error of the data by additionally using additional information, for example, soft decision data, about reliability of the soft decision data separate from the hard decision data and the error correction codes. That is, the controller 100 may determine the number of times of the soft decision based on the health monitoring data HDATA.

Hereinafter, a case, in which it is determined preferable that the maximum number of times of the decoding operations of read data is set to three, will be described as an example. Here, the determination is on the basis of a result of the identification of the width of the threshold voltage distribution based on the health monitoring data HDATA.

In step S705, the read operation is performed. When the read operation is performed, the controller 100 outputs the command signal CMD and an address signal ADD to the memory device 200. The controller 100 controls the memory device 200 so that the memory device 200 may output three read data by using different read voltages based on the health monitoring data. First, the memory device 200 reads first read data from the memory cells by using a first read voltage, and then outputs the read first read data to the controller.

In step S707, the decoding operation is performed. The decoding operation of the error correction circuit 130 is a publicly known technology, so that a detailed description thereof will be omitted.

In step S709, it is determined whether the decoding operation of the error correction circuit 130 succeeds.

When the decoding operation fails, it is determined whether the number of times of the decoding operations reaches a predetermined maximum number of decoding by the health monitoring data in step S711. When the decoding operation is once performed the number of times of the decoding operation may not reach the maximum number of times of the decoding operation, so that the decoding operation is to be performed again. In this case, the decoding operation corresponds to the aforementioned soft decision. When the decoding operation may not succeed until the number of times of the decoding operation reaches the maximum number of times of the decoding operations through the repetition of steps S707 to S711, the decoding operation is performed again with the reed data obtained by using the changed read voltage.

Specifically, referring to FIGS. 6 and 7, it is checked whether the number of times of changes in the read voltage reaches a maximum number of times of the changes in the read voltage in step S713. The maximum number of times of the changes in the read voltage may also be determined based on the health monitoring data HDATA, For example, the maximum number of times of the changes in the read voltage may be set to be proportional or inverse proportional to the width of the threshold voltage distribution. Further, the maximum number of times of the changes in the read voltage may be fixed regardless of the health monitoring data.

When the number of times of the changes in the read voltage does not reach the maximum number of times of the changes in the read voltage, the read voltage is changed from a first read voltage Vread1 to a second read voltage Vread2 in step S715, and the memory device 200 outputs second read data to the controller 100 by performing the read operation with the changed read voltage Vread2 in the step S705.

Again, the steps S707, S709, and S711 may be repeatedly performed until the decoding operation succeeds within the allowed number of times. When the decoding operation fails the steps S713, S715, and S705 may be performed again, and then the steps S707, S709, and S711 for the decoding operation are performed. In this case, steps S715, S705, and S707 may be performed by the same manner as those of the steps S517, S505, and S511 described with reference to FIG. 5, and may be appropriately changed and performed.

When the decoding operation succeeds during the aforementioned operations, the decoded data is output to the outside, for example, a host. However, when the decoding operation fails even after the read voltage is changed by a maximum allowed number of times of the changes, the decoding operation fails and the process is ended through steps S713 and S717.

According to the above descriptions, the number of times of the repeated performance of the decoding operation for the read data is determined by using the health monitoring data HDATA including information on the threshold voltage distributions of the memory cells, and the decoding operations are repeatedly performed within the predetermined number of times, it may be possible to prevent the decoding operation from being redundantly repeated when the decoding operation is impossible, thereby improving an operation speed.

In the meantime, when the decoding operation succeeds, the number of the input read data or the number of times of the decoding operation may be reflected to the health monitoring data and be updated in the CAM block. In this case, a success condition of the previous decoding operation, as well as the width of the threshold voltage distribution is monitored in a next decoding operation, so that the decoding operation may more rapidly succeed.

As described above, the exemplary embodiments have been disclosed in the drawings and the specification. The specific terms used herein are for purposes of illustration, and do not limit the scope of the present invention defined in the claims. Accordingly, those skilled in the art will appreciate that various modifications and another equivalent example may be made without departing from the scope and spirit of the present disclosure. Therefore, the sole technical protection scope of the present invention will be defined by the technical spirit of the accompanying claims.

What is claimed is:

1. A semiconductor device, comprising:
a memory device suitable for outputting health monitoring data including information on a threshold voltage distribution, and outputting read data read from memory cells included in the memory device; and
a controller suitable for receiving a predetermined quantity of the read data from the memory device, and performing a decoding operation for an error correction by using the received read data,
wherein the health monitoring data is read from a content-addressable memory (CAM) block of the memory device when a power of the memory device is increased to a stable level, and the predetermined quantity of the read data is determined according to the health monitoring data.

2. The semiconductor device of claim 1, wherein, when the threshold voltage distribution is determined to be wide based on the health monitoring data, the controller increases the quantity of read data used for the decoding operation.

3. The semiconductor device of claim 1, wherein, when the threshold voltage distribution is determined to be narrow, the controller decreases the quantity of read data used for the decoding operation.

4. The semiconductor device of claim 1, wherein the semiconductor device stores the health monitoring data in the CAM block, and stores the read data in a memory block.

5. The semiconductor device of claim 1, wherein the memory device repeatedly performs a read operation of the memory cells with changing of a read voltage to output the predetermined quantity of read data based on the health monitoring data.

6. The semiconductor device of claim 5, wherein the memory device performs the read operation with changing of the read voltage in a range in which adjacent threshold voltage distributions overlap.

7. The semiconductor device of claim 1, wherein, when the decoding operation using the predetermined quantity of read data fails, the controller receives additional read data from the memory device and performs an additional decoding operation.

8. The semiconductor device of claim 7, wherein the memory device performs an additional read operation of the memory cells by using the changed read voltage to output the additional read data.

9. The semiconductor device of claim 8, wherein the controller repeatedly performs the additional decoding operation until a maximum allowed quantity of additional read data is received from the memory device.

10. The semiconductor device of claim 1, wherein the memory device includes a NAND flash memory.

11. A semiconductor device, comprising:
- a memory device suitable for outputting health monitoring data including information on a threshold voltage distribution, and outputting read data read from memory cells included in the memory device; and
- a controller suitable for receiving the health monitoring data and the read data from the memory device, and repeatedly performing a decoding operation for an error correction by a predetermined number of times until the decoding operation using the read data succeeds,
- wherein the health monitoring data is read from a content-addressable memory (CAM) block of the memory device when a power of the memory device is increased to a stable level, and the predetermined number of times is determined according to the health monitoring data.

12. The semiconductor device of claim 11, wherein, when the threshold voltage distribution is determined to be wide based on the health monitoring data, the controller increases the number of times of repeated performances of the decoding operation.

13. The semiconductor device of claim 11, wherein, when the threshold voltage distribution is determined to be narrow based on the health monitoring data, the controller decreases the number of times of repeated performances of the decoding operation.

14. The semiconductor device of claim 11, wherein the health monitoring data is stored in the CAM block included in the memory device, and the read data is stored in a memory block including the memory cells.

15. The semiconductor device of claim 11, wherein, when the decoding fails even after performing the predetermined number of times of the decoding operation, the memory device outputs additional read data read by a changed read voltage to the controller.

16. The semiconductor device of claim 15, wherein the memory device reads the additional read data by using the changed read voltage within a range in which adjacent threshold voltage distributions overlap.

17. The semiconductor device of claim 15, wherein the controller repeatedly performs the decoding operation by the predetermined number of times based on the health monitoring data until the decoding operation using the additional read data succeeds.

18. The semiconductor device of claim 15, wherein the controller repeatedly performs the decoding operation by using additional read data output with a changed read voltage until the number of times of changes in the read voltage reaches a maximum value.

19. The semiconductor device of claim 18, wherein the controller repeatedly performs the decoding operation with changing of the read voltage by the allowed number of times until the decoding operation succeeds.

20. A semiconductor device, comprising:
- a memory device suitable for outputting health monitoring data including information on a threshold voltage distribution, and outputting read data read from memory cells included in the memory device; and
- a controller suitable for performing decoding operations for an error correction of the read data, wherein the number of repetition of the decoding operations is determined based on the health monitoring data,
- wherein the health monitoring data is read from a content-addressable memory (CAM) block of the memory device when a power of the memory device is increased to a stable level.

* * * * *